Figure 1:
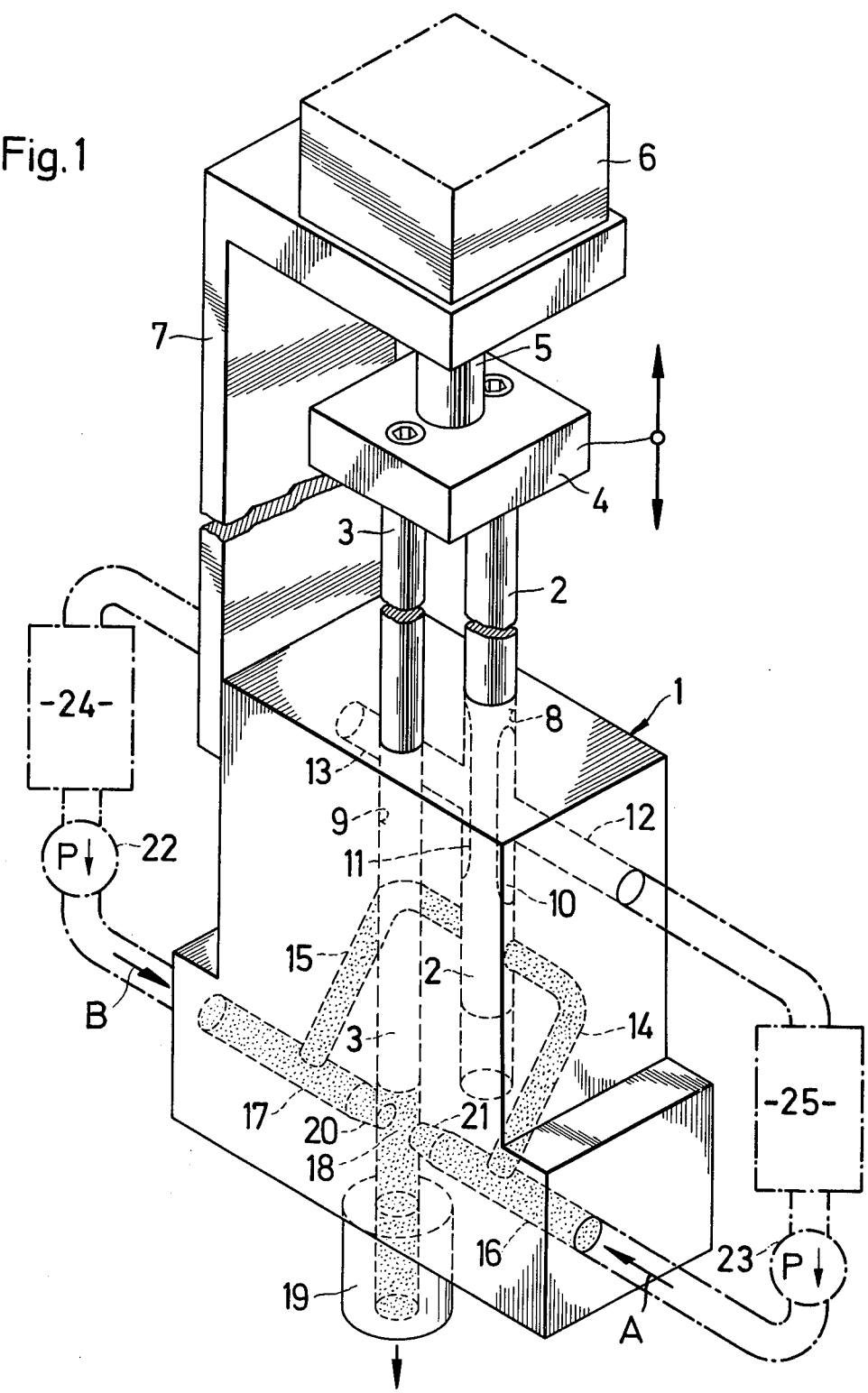

United States Patent [19]

Ernst

[11] 3,964,731

[45] June 22, 1976

[54] MIXING APPARATUS FOR MULTI-COMPONENT PLASTICS, PARTICULARLY POLYURETHANE

[75] Inventor: Rudolf Ernst, Munich-Solln, Germany

[73] Assignee: Firma Elastogran Maschinenbau GmbH & Co., Munich, Germany

[22] Filed: Apr. 9, 1975

[21] Appl. No.: 566,446

[30] Foreign Application Priority Data
Apr. 10, 1974  Germany............................ 2417513

[52] U.S. Cl................................ 259/4 R; 259/18; 259/95; 137/563; 137/604; 222/318; 425/134; 425/245 R
[51] Int. Cl.²...................... B01F 5/00; B01F 15/02
[58] Field of Search .............. 259/4, 18, 36, 60, 95, 259/98; 222/318; 137/563, 604; 425/130, 134, 245 R, 244

[56] References Cited
UNITED STATES PATENTS

| | | |
|---|---|---|
| 3,306,495 | 2/1967 | Wabers .......................... 222/318 X |
| 3,706,515 | 12/1972 | Keuerleber ............................ 425/4 |
| 3,788,337 | 1/1974 | Breer .............................. 137/563 X |
| 3,799,199 | 3/1974 | Rumpff ........................... 259/4 R X |

Primary Examiner—Billy J. Wilhite
Assistant Examiner—James A. Niegowski
Attorney, Agent, or Firm—James R. Haller; H. Dale Palmatier

[57] ABSTRACT

A mixing apparatus including a mixing chamber with a reciprocating valve piston and a separate "recycle" chamber with a reciprocating grooved plunger. Piston and plunger are controlled in unison by a piston and cylinder assembly. In the "open" position of the valve piston pressurized components supplied through inlet conduits may enter the mixing chamber. In the "closing" position of the valve piston, the components supplied are by-passed across the grooved plunger back to their respective reservoirs.

4 Claims, 2 Drawing Figures

U.S. Patent June 22, 1976 Sheet 2 of 2 3,964,731

MIXING APPARATUS FOR MULTI-COMPONENT PLASTICS, PARTICULARLY POLYURETHANE

The present invention relates to a mixing apparatus for multi-component plastics such as polyurethanes. The mixing apparatus includes a mixing chamber into which open ports of inlet conduits. A valve piston the dimensions of which are closely adapted to the internal dimensions of the mixing chamber is movable to and fro within the mixing chamber and serves to open or close the ports of the inlet conduits for the components. The apparatus furthermore includes movable return flow grooves for communicating, in a closing position, the inlet conduits with associated return flow grooves.

In a heretofore known mixing apparatus of the above type the return flow grooves are arranged on the valve piston. In the closing position of the valve piston the components flow along separate flow paths without meeting each other and pass into the return flow conduits through which the components are recycled to their associated reservoirs. In the closing position, the components are continuously circulated in closed loop circuits whereby the dissociation of constituents is avoided. When the valve piston is moved into the open position, the components may then be injected readily into the mixing chamber, without the risk of so-called "advancing effects". In the heretofore known mixing apparatus the valve piston serves a dual function, i.e. the valve function (opening and closing of the inlet ports and moving of the return flow grooves) and an additional purging function. For this purging function, the valve piston which is dimensionally adapted to the mixing chamber necessarily performs a mechanical purging of the mixing chamber by pressing out all residual mixture contained therein when the piston is moved into the closing position. In this heretofore known mixing apparatus the diameter of the valve piston and thereby the maximum available cross sectional area for the return flow grooves are dependent upon and limited by the diameter of the mixing chamber. The diameter of the mixing chamber is frequently relatively small with the aim of obtaining intimate mixing and to allow for the handling of very small weights of shot (quantity of material per shot). Even when manufacturing the valve piston from very high quality materials there is a lower limit for the smallest cross sectional area the piston may have. In the conventional mixing apparatus the components supplied pass, in the return flow position of the valve piston, likewise through nozzles or portions of reduced cross sectional area at the entry end of the inlet conduits to the mixing chamber. This may result in undesired foaming when the components are recycled to their respective reservoirs. If the valve piston is not moved from the return flow position over an extended period of time fatigue effects may be encountered in the components. Additionally, heating of the components may occur in the return flow position when the components pass through the narrow throat portions. This heating is highly disadvantageous (for further details refer to German Laying-Open specification No. 2,007,935 which corresponds to U.S. Pat. No. 3,706,515).

It is now the object of the present invention to provide a novel and improved mixing apparatus of the general type stated above wherein the valve piston may be dimensioned independently of the dimensions of the return flow grooves.

In accordance with the present invention, this object is achieved by the fact that the movable return flow grooves are provided in a separate grooved plunger which extends parallel to the valve piston and is movable in unison with the valve piston.

Since in accordance with the present invention the return flow grooves are provided in a separate grooved plunger the return flow plunger may be of a relatively large cross sectional area in thus allowing the formation of return flow grooves having likewise relatively large cross sectional areas. The valve piston the dimensions of which correspond to the dimensions of the mixing chamber may be of very small cross sectional area so that the capacity of the mixing chamber may be very small. The manufacturing requirements for the return flow grooves are less stringent than in the case of the heretofore known mixing apparatus since due to the correspondingly large cross sectional area of the grooved plunger sufficient cross sectional area is available. By suitably selecting the cross sectional area of the return flow grooves the obstruction against the passage of fluids in the return flow position may be kept at a minimum.

In the mixing apparatus of the present invention the components need not flow, in the return flow position, through nozzles or reduced diameter portions at the entry end of the inlet conduits leading to the mixing chamber. The return flow grooves and the associated conduits and pipes or lines may be dimensioned so that throughout the return flow circuit for every component there are no in-line throat portions that might result in the above described drawbacks. The return flow circuits may therefore be considered to be low pressure recycling circuits.

Figure 2:
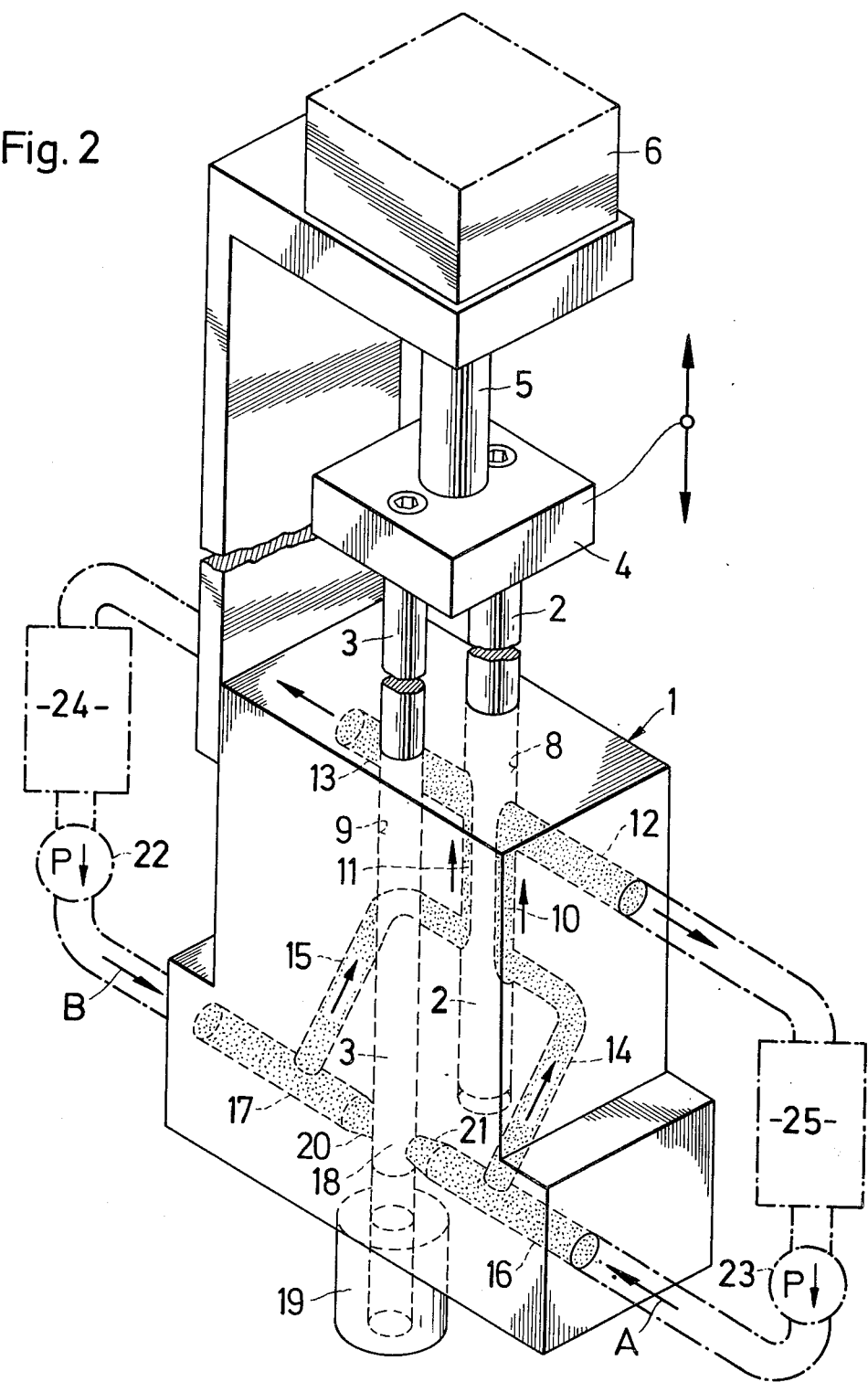

Further advantages and the various characteristics of the present invention will be described more in detail in the following with reference to an illustrative embodiment shown in the appended drawing wherein FIG. 1 is a schematical perspective view of an embodiment of a mixing apparatus in accordance with the present invention, the valve piston being in the opening position (mixture position); and FIG. 2 is a schematical perspective view similar to FIG. 1 but wherein the valve piston is in the closing position (return flow position).

As shown in the drawings, the mixing apparatus includes a housing 1 the outlines of which are indicated by thin lines. Within the housing 1 are arranged several bores. A first cylindrical bore 9 serves to receive a valve piston 3. The lower end of this cylindrical bore 9 defines a mixing chamber 18. A second cylindrical bore 8 which is placed from the first cylindrical bore 9 and parallel thereto serves to receive a grooved plunger 2. The grooved plunger is provided with two return flow grooves 10 and 11.

Plunger 2 and piston 3 are connected at one of their ends to a common plate 4 which may be reciprocated by means of a hydraulic piston and cylinder assembly 5,6. The piston and cylinder assembly 5,6 is connected to the housing 1 by means of a rigid member 7.

Into the mixing chamber 18 open two inlet bores 16 and 17 for feeding two components to the mixing chamber. The components are continuously supplied from respective reservoirs not shown by means of pumps. The flow of the components is indicated by the arrows A and B. Each inlet conduit 16 and 17 communicates through an associated connecting conduit 14 or 15 respectively with the cylindrical bore 8. Above the inlet ports of the connecting conduits 14 and 15 at the cylindrical bore 8 the latter communicates with a pair of return flow conduits 12 and 13 that extend likewise through the housing 1. Externally of the housing 1 the mixing chamber 18 extends into a casting orifice.

As may be seen from FIG. 1 (valve piston 3 in the opening position) the two components A and B are supplied under pressure through the inlet conduits 16 and 17 into the mixing chamber 18. The inlet conduits 16 and 17 thereby serve as feed conduits. Within the mixing chamber 18 the components are thoroughly mixed and are subsequently discharged into a mold. No flow through the connecting conduits 14 and 15 is allowed since in this condition of the apparatus the inlet ports of these conduits at the cylindrical bore 8 are blocked by a full cross sectional area cylindrical portion of the grooved plunger 2.

For terminating the supply of mixture, i.e. for terminating a shot, the piston and cylinder assembly 5, 6 is controlled hydraulically so as to move the grooved plunger 2 and the valve piston 3 downwardly. By this downward movement the inlet conduits 16 and 17 are blocked and thereby the entry of components into the mixing chamber 18 is interrupted. Simultaneously the valve piston 3 pushes residual mixture out of the mixing chamber 18 in thereby mechanically purging the same entirely.

Since the grooved plunger 2 follows the movement of the valve piston 3, the return flow conduits 10 and 11 will be put into communication with the inlet ports of the connecting conduits 14 and 15 in thus communicating these connecting conduits 14 and 15 with the return flow conduits 12 and 13 respectively via the return flow grooves 10 and 11 respectively. The components will then flow continuously along so-called recycling circuits.

When the next following shot is intended to be discharged, i.e. the next mixture is to be prepared, the plunger 2 and the piston 3 are moved upwardly and thereby back again into the position of FIG. 1.

The throat portions or portions of reduced cross sectional area of the inlet conduits 16 and 17 in the vicinity of the ports at the mixing chamber 18 are indicated by 20 and 21 respectively. In the return flow or recycle position (shown in FIG. 2), the components do not pass these nozzles or throat portions 20 and 21 but will flow along the connecting conduits 14 and 15, the return flow grooves 10 and 11 and the return flow conduits 12 and 13 back to their respective reservoirs. The cross sectional area of the whole flow circuit is suitably selected without any reduced diameter portions so as not to obstruct the component return flow. Therefore the return flow does not lead to an increase in pressure as may occur in the feed flow at the nozzles or throats 20 and 21.

What is claimed is:

1. A mixing apparatus for multi-component plastics such as polyurethane, including a mixing chamber into which open ports of inlet conduits, a valve piston having dimensions closely adapted to the internal dimensions of the mixing chamber and movable to and fro within the mixing chamber and serving to open or close the ports of the inlet conduits for the components, and movable return flow grooves for communicating the inlet conduits with associated return flow conduits when the inlet ports are closed by the piston, said mixing apparatus further characterized in that the movable return flow grooves are provided in a separate grooved plunger driven by means driving the piston and which extends parallel to the valve piston and is movable in unison with the valve piston.

2. A mixing apparatus for multi-component plastics such as polyurethanes, including a housing providing a mixing chamber with component inlet ports, inlet conduits for supplying components from component reservoirs to the inlet ports under pressure, bypass conduits for recirculating the components to the reservoirs, a valve piston movable to and fro in the mixing chamber and opening or closing the inlet ports as the piston moves through mixing chamber purging and return strokes, means driving the piston through purging and return strokes, the housing including a separate bore communicating the inlet conduits with the bypass conduits, and a plunger driven by the driving means and movable in the bore parallel to and in unison with the piston, the plunger having return flow grooves oriented to provide return flow communication for the respective conduits through the bore when the piston blocks the inlet ports, and the plunger preventing return flow of components through the bore when the inlet ports are unblocked by the piston.

3. A mixing apparatus as in claim 2, characterized in that the grooved plunger is of a larger diameter than the valve piston.

4. The mixing apparatus of claim 2 in which the bypass conduits and return flow grooves of the plunger provide return flow paths which are substantially free of reduced diameter portions obstructing the return flow of the respective components.

* * * * *